United States Patent
Bindner et al.

(10) Patent No.: US 11,964,565 B2
(45) Date of Patent: Apr. 23, 2024

(54) TRUNNION MOUNT FOR MOUNTING AN ENGINE

(71) Applicant: Liebherr-Components Colmar SAS, Colmar (FR)

(72) Inventors: Thierry Bindner, Strasbourg (FR); Benjamin Potier, Colmar (FR); Anthony Leib, Colmar (FR); Sebastien Ranucci, Barr (FR)

(73) Assignee: LIEBHERR-COMPONENTS COLMAR SAS, Colmar (FR)

( * ) Notice: Subject to any disclaimer, the term of this patent is extended or adjusted under 35 U.S.C. 154(b) by 0 days.

(21) Appl. No.: 17/662,391

(22) Filed: May 6, 2022

(65) Prior Publication Data
US 2022/0258590 A1    Aug. 18, 2022

Related U.S. Application Data

(63) Continuation of application No. 16/578,170, filed on Sep. 20, 2019, now Pat. No. 11,351,852.

(30) Foreign Application Priority Data

Nov. 16, 2018   (DE) .................... 10 2018 128 878.6

(51) Int. Cl.
*B60K 5/12*    (2006.01)
*F16C 33/22*    (2006.01)

(52) U.S. Cl.
CPC ............ *B60K 5/1216* (2013.01); *F16C 33/22* (2013.01)

(58) Field of Classification Search
CPC ..... B60K 5/1216; B60K 5/1225; F16C 33/22; B60Y 2200/142; B60Y 2200/412; B60Y 2200/41

(Continued)

(56) References Cited

U.S. PATENT DOCUMENTS 1,701,396 A    2/1929  Summers
1,831,628 A *  11/1931 Kuenzel .............. B60K 5/1225
                                        403/228

(Continued)

FOREIGN PATENT DOCUMENTS

AU           145221      2/1952
CN       105818666 A     8/2016

(Continued)

OTHER PUBLICATIONS

European Patent Office, Extended European Search Report Issued in Application No. 19198548.0, dated Apr. 22, 2020, Germany, 23 pages.

(Continued)

*Primary Examiner* — Muhammad Ijaz
(74) *Attorney, Agent, or Firm* — McCoy Russell LLP

(57) ABSTRACT

The present disclosure discloses a trunnion mount for mounting an engine, in particular a combustion engine, to a chassis, comprising a support element rigidly connected and/or connectable to the engine having a ring portion with an outer bearing surface, which may be arranged concentrically around the crankshaft; a female support having an inner bearing surface for surrounding the bearing surface of the support element, the female support forming the link between the chassis and the engine; and a rubber bearing arranged between the inner bearing surface of the female support and the outer bearing surface of the support element. In one or more examples, the trunnion mount includes a rubber bearing that is directly vulcanized on at least one of the bearing surfaces and/or wherein the ring portion is formed as a separate element from a mounting portion of the support element and connectable thereto via axial screws.

21 Claims, 4 Drawing Sheets

(58) Field of Classification Search
USPC .................................................. 248/560, 609
See application file for complete search history.

(56) References Cited

U.S. PATENT DOCUMENTS

| | | | |
|---|---|---|---|
| 1,975,810 A | 10/1934 | Trott | |
| 2,251,398 A | 8/1941 | Clark | |
| 2,258,420 A | 10/1941 | Piron | |
| 2,267,312 A | 12/1941 | Smith | |
| 2,282,174 A | 5/1942 | Else et al. | |
| 2,498,126 A | 2/1950 | Koch | |
| 2,954,193 A | 9/1960 | Loftis | |
| 3,012,743 A * | 12/1961 | Jenkins | H02K 5/24 |
| | | | 248/606 |
| 3,083,065 A | 3/1963 | Hinks et al. | |
| 3,135,224 A | 6/1964 | McClean | |
| 3,580,532 A | 5/1971 | Schmitt | |
| 3,633,856 A | 1/1972 | Crews | |
| 3,685,773 A | 8/1972 | Otto | |
| 3,750,267 A | 8/1973 | Otto | |
| 3,770,231 A | 11/1973 | Kirchgessner et al. | |
| 4,438,703 A | 3/1984 | Eggert, Jr. | |
| 4,467,753 A * | 8/1984 | Lange | B60K 5/1216 |
| | | | 123/195 A |
| 4,707,149 A | 11/1987 | Hahle | |
| 4,923,178 A * | 5/1990 | Matsumoto | F16F 13/14 |
| | | | 267/219 |
| 5,460,238 A * | 10/1995 | Burke | B60K 5/1216 |
| | | | 267/293 |
| 6,189,873 B1 * | 2/2001 | Aoki | F16F 13/264 |
| | | | 267/140.14 |
| 6,321,890 B1 * | 11/2001 | Suzuki | B60K 5/1208 |
| | | | 188/380 |
| 6,415,884 B1 * | 7/2002 | Hawener | B60K 5/1216 |
| | | | 180/311 |
| 9,644,697 B2 | 5/2017 | Mitsch | |
| 2004/0201152 A1 * | 10/2004 | Miyahara | F16F 13/14 |
| | | | 267/140.12 |
| 2012/0235334 A1 * | 9/2012 | Suzuki | F16F 1/3849 |
| | | | 267/141 |
| 2017/0023171 A1 | 1/2017 | Khan | |
| 2019/0242334 A1 * | 8/2019 | Diehl | F02M 35/10039 |
| 2020/0156453 A1 * | 5/2020 | Bindner | B60K 5/1216 |

FOREIGN PATENT DOCUMENTS

| | | |
|---|---|---|
| DE | 2030984 A1 | 1/1971 |
| DE | 3531340 A1 | 3/1987 |
| DE | 102006019264 A1 | 10/2007 |
| DE | 112014005227 T5 | 8/2016 |
| EP | 2711223 | 3/2014 |
| FR | 726969 A | 6/1932 |
| JP | H09170635 A | 6/1997 |
| JP | 2014214847 A | 11/2014 |

OTHER PUBLICATIONS

European Patent Office, Extended European Search Report Issued in Application No. 19198600.9, dated Apr. 28, 2020, Germany, 9 pages.
European Patent Office, Office Action Issued in Application No. 19198548.0, dated Mar. 19, 2021, Germany, 7 pages.
European Patent Office, Office Action Issued in Application No. 19198600.9, dated Apr. 15, 2021, Germany, 7 pages.

* cited by examiner

TRUNNION MOUNT FOR MOUNTING AN ENGINE

CROSS REFERENCE TO RELATED APPLICATIONS

The present application is a continuation of U.S. Non-Provisional patent application Ser. No. 16/578,170, entitled, "TRUNNION MOUNT FOR MOUNTIN AN ENGINE," and filed on Sep. 20, 2019. U.S. Non-Provisional patent application Ser. No. 16/578,170 claims priority to German Application No. 10 2018 128 878.6 entitled "TRUNNION MOUNT FOR MOUNTING AN ENGINE," filed on Nov. 16, 2018. The entire contents of the above listed applications are hereby incorporated by reference for all purposes.

TECHNICAL FIELD

The present application is directed to a trunnion mount for mounting an engine, in particular a combustion engine, to a chassis.

BACKGROUND AND SUMMARY

In particular, the trunnion mount comprises a support element rigidly connected and/or connectable to the engine and having a ring portion with an outer bearing surface, a female support having an inner bearing surface for surrounding the bearing surface of the support element, the female support forming the link between the chassis and the engine, and a bearing element arranged between the inner bearing surface of the female support and the outer bearing surface.

Such trunnion mounts are used to increase the stability of the engine mount in its environment, minimize deformation energy coming from the chassis of the machine (loaded e. g. under torsion) and transmitted to the engine block, and minimize deformation energy coming from the engine block (loaded e. g. by accelerations, vibrations and thermal expansion) transmitted to the chassis of the machine. This function is achieved because the trunnion mount provides damping and degrees of freedom between the chassis and the engine block around the crankshaft axis and in engine axial direction.

US 2017/0023171 A1 shows a trunnion mount for an engine used in a transport stand for transporting different types of engines.

In one type of known trunnion mounts a metal bearing element is used. This type of bearing however needs external lubrication and therefore an external lubrication circuit to guarantee good lubrication conditions. Further, during operation, corrosion may appear and finally block the relative movement between the relative parts when lubrication is not properly ensured.

In a second type of known trunnion mounts, a rubber bearing composed of two separate elements each forming a half circle is used. Each part is composed of two layers of sheet metal and an intermediate layer of rubber. The two bearing half circles are compressed by two half shelves forming the female support assembled around the rubber bearing and tightened together by screws. Further, two side pins are used for securing the rubber bearing in its position. The major drawback of this solution is that proper contact between the ring portion of the support element and the metal sheet of the rubber bearing is only provided by the pressure created by the screws, and that local contact between the side pins and the bearing creates shear stress which can lead to cracks.

The object of the present disclosure is therefore to provide an improved trunnion mount.

This object is solved in a first aspect by a trunnion mount disclosed herein.

In a first aspect, the present disclosure comprises a trunnion mount for mounting an engine, comprising:

a support element rigidly connected and/or connectable to the engine having a ring portion with an outer bearing surface, a female support having an inner bearing surface for surrounding the bearing surface of the support element, the female support forming the link between the chassis and the engine, and a rubber bearing arranged between the inner bearing surface of the female support and the outer bearing surface of the support element.

According to a first variant of the first aspect, the rubber bearing is directly vulcanized on at least one of the bearing surfaces, i. e. on the outer bearing surface of the ring portion and/or the inner bearing surface of the female support. By vulcanizing the rubber bearing directly on the bearing surface, proper contact pressure around the entire rubber bearing is assured. Further, the wear is reduced. The trunnion mount is easy to manufacture in mass production.

In an embodiment of the present disclosure, a first rubber surface of the rubber bearing is directly vulcanized on the bearing surface of the ring portion and/or the female support, and a second rubber surface of the rubber bearing is in direct contact either with the bearing surface of the other element out of the ring portion and/or the female support, or with a rubber bearing also vulcanized on this bearing surface.

In an embodiment of the present disclosure, the rubber bearing is only formed one or more layers of rubber.

In a second variant of the first aspect, the ring portion is formed as a separate element from a mounting portion of the support element and connectable thereto via axial screws. This simplifies assembly of the trunnion mount.

In a particular, forming the ring portion as a separate element allows to assemble the ring portion with the rubber bearing and/or the female support before the ring portion is connected to the engine.

This is of particular advantage if out least two out of the ring portion, the female support and/or the rubber bearing are axially press-fitted with each other, because the forces necessary for such an operation can be more easily applied while the ring portion is not yet connected to the engine. Connecting the ring portion, the female support and/or the rubber bearing with each other can for example be performed in a different place than the final assembly of the engine to the chassis.

In an embodiment of the present disclosure, the ring portion has a ring element, the outer surface of which is forming the outer bearing surface, wherein holes for the screws extend in the axial direction through the ring element from a first axial end surface to a second axial end surface of the ring element.

Because one of the axial end surfaces reaches through the female support, the holes for the screws are easily accessible even if the female support is already mounted to the ring portion.

In at least one example, the ring portion is formed by a ring element, such as a ring element as described above.

In an embodiment of the present disclosure, the mounting portion of the support element has a ring-like mounting surface to which one axial end surface of the ring portion is abutting. In at least one example, the ring-like mounting surface comprises screw holes for receiving the screws that connect the ring portion to the mounting portion.

In an embodiment of the present disclosure, the mounting portion of the support element has a protrusion extending in the axial direction relative to the mounting surface and abutting with an inner or outer side surface of the ring portion. This will provide a form-fit in the radial direction between the ring portion and the mounting portion.

In an embodiment of the present disclosure, the protrusion is ring-like and/or concentric with the mounting surface. In at least one example, the protrusion surrounds the mounting surface.

This first and the second variant of the first aspect can also be applied independently from each other.

In particular, in a possible embodiment of the first variant of the first aspect, the rubber bearing is directly vulcanized on a ring portion that is formed integrally with a mounting portion of the support element.

In a possible embodiment of the second variant of the first aspect, the rubber bearing is formed as a separate element and connected to the ring portion and/or the half female support for example by a press-fit.

In at least one example, the first and second variants of the first aspect are combined.

In an embodiment of the first and/or second variant of the first aspect, the rubber bearing is axially press-fit with the ring portion and/or the female support. Thereby, proper contact pressure around the entire rubber bearing is assured.

This solution however also forms an independent aspect of the present disclosure that is not necessarily used together with the first aspect.

Therefore, the present disclosure comprises in a second aspect a trunnion mount for mounting an engine, in particular a combustion engine, to a chassis, comprising a support element rigidly connected and/or connectable to the engine having a ring portion with an outer bearing surface, which may be arranged concentrically around the crankshaft, a female support having an inner bearing surface for surrounding the bearing surface of the support element, the female support forming the link between the chassis and the engine, and a rubber bearing arranged between the inner bearing surface of the female support and the outer bearing surface of the support element.

According to the second aspect, the rubber bearing is axially press-fit with the ring portion and/or the female support. Thereby, proper contact pressure around the entire rubber bearing is assured.

The second aspect may be combined with the first and/or second variant of the first aspect.

In at least one example, a rubber surface of the rubber bearing is press-fit with the ring portion and/or the female support, such that no precision machining is necessary for preparing the surfaces with the right diameter for the press-fit operation.

In at least one example, the ring portion and/or the rubber bearing are axially press-fit into the female support.

In a first variant, the outer bearing surface of the ring portion is provided with the rubber bearing, in particular by direct vulcanization, and the female support is press-fit onto the rubber bearing of the ring portion. In a second variant, the inner bearing surface of the female support is provided with the rubber bearing, in particular by direct vulcanization, and the female support with the rubber bearing is press-fit onto the ring portion.

In one or more examples of the present disclosure, the female support has a ring section surrounding the ring portion of the support element around the entire circumference. This provides the necessary contact pressure.

In at least one example, the ring portion is formed as a single piece. For example, the ring portion may be formed as a single cast iron part.

In an embodiment of the present disclosure, the female support further comprises mounting pads for mounting the female support on the chassis. The ring portion and the mounting pads are formed integrally as a single piece in at least one example. For example, the ring portion and the mounting pads may be formed as a single cast iron part.

In an embodiment of the present disclosure, the trunnion mount is configured such that the ring portion is connectable to the engine in a pre-assembled state where it is already connected to the female support. This aspect may also form part of the present disclsoure independently from the remaining aspects.

The present disclosure comprises in a third aspect a trunnion mount for mounting an engine to a chassis, comprising a support element rigidly connected and/or connectable to the engine having a ring portion with an outer bearing surface, which may be arranged concentrically around the crankshaft, a female support having an inner bearing surface for surrounding the bearing surface of the support element, the female support forming the link between the chassis and the engine, and a rubber bearing arranged between the inner bearing surface of the female support and the outer bearing surface of the support element.

The third aspect may be characterized in that the trunnion mount is configured such that the ring portion is connectable to the engine in a pre-assembled state where it is already connected to the female support.

The third aspect may be combined with the first and/or the second aspect, in at least one example.

Further, all the three aspects and their variants may be combined, in at least one example. However, alternatively, some of the aspects or the variants do not have to be used.

In a possible embodiment of the first variant of the first aspect, and/or the second and/or third aspect, the mounting portion and the ring portion can be formed as a single piece. In this case, the connection between the mounting portion and the engine may be configured such that it can be accessed when the female support is already mounted on the ring portion.

In a possible embodiment of the second variant of the first aspect, and/or the second and/or third aspect, a rubber bearing that is formed separately from the ring portion and the female support is used.

In the following, possible further embodiments that can be applied to a trunnion mount according to the first aspect, according to the second aspect, according to the third aspect and according to any combination of these aspects are described.

As described above with respect to the second aspect, the female support may have a ring section formed as a single piece.

In an alternative embodiment, the female support comprises two half shelves, and the rubber bearing is compressed between the ring portion of the support and the two half shelves. In an embodiment of the present disclosure, the lower half shelf comprises a part of the inner bearing surface on its upper surface and the upper half shelf comprises a part of the inner bearing surface on its lower surface.

In an embodiment of the present disclosure, the upper half shelf is connected and/or connectable to the lower half shelf via one or more screws. In particular, the screws may extend in a direction that is perpendicular to the axial direction of the engine. For example, the screws may extend in a vertical direction. The screws allow compression of the rubber bearing.

In an embodiment of the present disclosure, the lower half shelf comprises mounting pads for mounting the female support to a chassis. For example, the lower half shelf may be formed integrally with the mounting pads.

If a lower and upper half shelf are used, the rubber bearing may be provided on the ring portion of the support element. However, in an alternative embodiment, a first part of the rubber bearing is provided on the lower half female support and a second part is provided on the upper half female support.

Further embodiments of the present disclosure, which can be combined with any of the embodiments described so far, are described in the following:

In an embodiment of the present disclosure, the mounting portion is a support plate extending in a direction perpendicular to the axial direction of the engine.

The support plate may be connected and/or connectable to the engine casing and/or engine block via screws.

In an alternative embodiment, the mounting portion and/or support plate is formed integrally with an engine casing and/or the engine block.

In an embodiment of the present disclosure, the ring portion extends in an axial direction from the support plate.

In an embodiment of the present disclosure, the outer bearing surface of the ring portion is arranged concentrically around the crankshaft of the engine. In an embodiment, the crankshaft may extend through the ring portion.

In an embodiment of the present disclosure, the engine is a combustion engine, for example, an internal combustion engine.

The press-fit may be configured such that it requires a press fit force of at least 10 kN, and, in some examples, of at least 30 kN.

In an embodiment of the present disclousre, the bearing surface of the ring portion and/or the female support is circular in cross section.

In an embodiment of the present disclsoure, the bearing surface of the ring portion and/or the female support has a cylindrical form. The bearing surface may have a profile in the axial direction, for example in order to increase the connectivity with the rubber bearing and/or to center the rubber bearing in an axial direction.

The present disclosure further discloses an apparatus comprising a chassis and an engine, wherein the engine is connected to the chassis by at least one trunnion mount as described above.

In an embodiment of the present disclosure, the engine is connected to the chassis by a trunnion mount as described above on both axial sides of the engine.

In an alternative embodiment of the present disclosure, the engine is connected to the chassis by a trunnion mount as described above on one axial side of the engine only, and a different type of mount is used for connecting the engine to the chassis on the other side.

In an embodiment of the present disclsoure, the apparatus is a mobile working machine. For example, the apparatus is an earth moving machine such as an excavator and/or a dumper truck.

In an embodiment of the present disclosure, the apparatus is a stationary machine, for example for generation of electricity. In particular, the engine may be connected to a generator for generation of electricity.

In an embodiment of the present disclsoure, the engine is a combustion engine, in particular a Diesel or Otto engine.

The present disclosure further discloses a method for mounting an engine, in particular a combustion engine, to a chassis via a trunnion mount as described above.

The present disclosure further includes a method for mounting an engine, in particular a combustion engine, to a chassis via a trunnion mount, in particular via a trunnion mount as described above, the trunnion mount comprising a support element rigidly connected and/or connectable to the engine having a ring portion with an outer bearing surface, which may be arranged concentrically around the crankshaft, a female support having an inner bearing surface for surrounding the bearing surface of the support element, the female support forming the link between the chassis and the engine, and a rubber bearing arranged between the inner bearing surface of the female support and the outer bearing surface of the support element, The method may comprise a step of pre-assembling the ring portion of the support element with the female support and a step of mounting the ring portion to the engine in a pre-assembled state where the ring portion is already connected to the female support.

The method of the present disclsoure has the advantages already described above with respect to the third aspect. Further, the method may be performed as described above.

In an embodiment of the present disclosure, the method comprises a step of mounting a mounting portion of the support element to the engine, wherein the ring portion is mounted to the engine by connecting it to the mounting portion. For example, the mounting portion is connected to the engine before the ring portion is connected to the mounting portion.

In an alternative embodiment of the present disclosure, the mounting portion of the support element is formed integrally with an engine casing or an engine block In an embodiment of the present disclosure, the ring portion of the support element are pre-assembled via a press-fit operation.

In an embodiment of the present disclosure, the method uses a trunnion mount as described above with respect to the first to third aspects and any combination thereof, and/or is performed as described above in relation to these aspects and their combinations.

BRIEF DESCRIPTION OF FIGURES

The present disclosure is further described with respect to illustrative figures.

The Figures Show.

DETAILED DESCRIPTION

Figure 1:
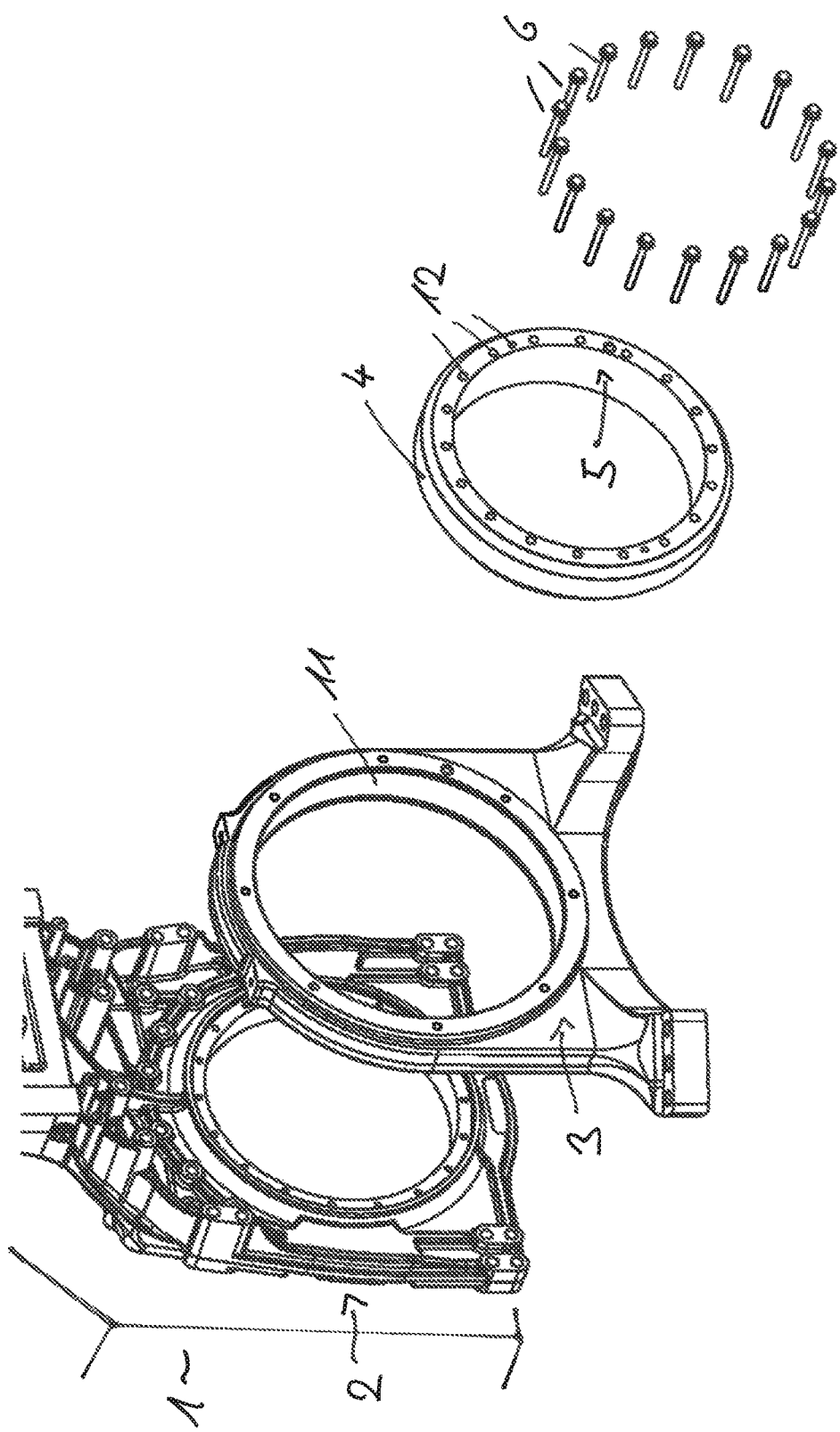
FIG. 1 an exploded view of an embodiment of a trunnion mount according to at least one example of the present disclsoure.
Figure 2:
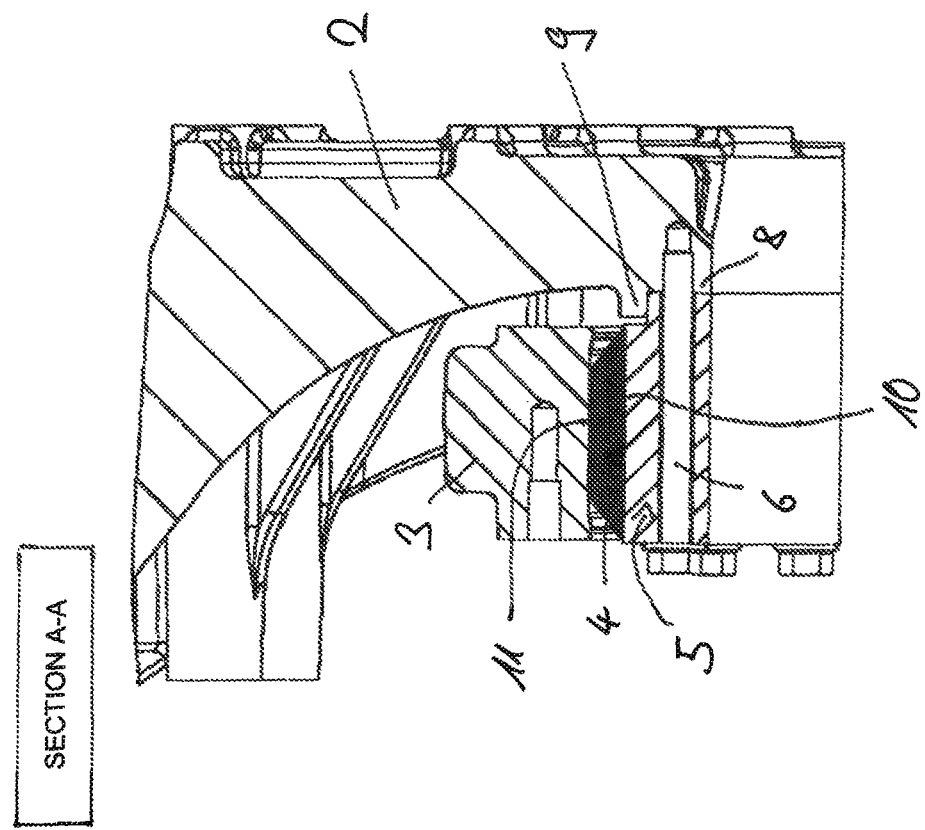
FIG. 2 a perspective view of the embodiment of the trunnion mount in an assembled state and a cut view along a plane extending in an axial and radial direction, showing the trunnion mount and a final assembled state, according to at least one example of the present disclosure.
Figure 2:
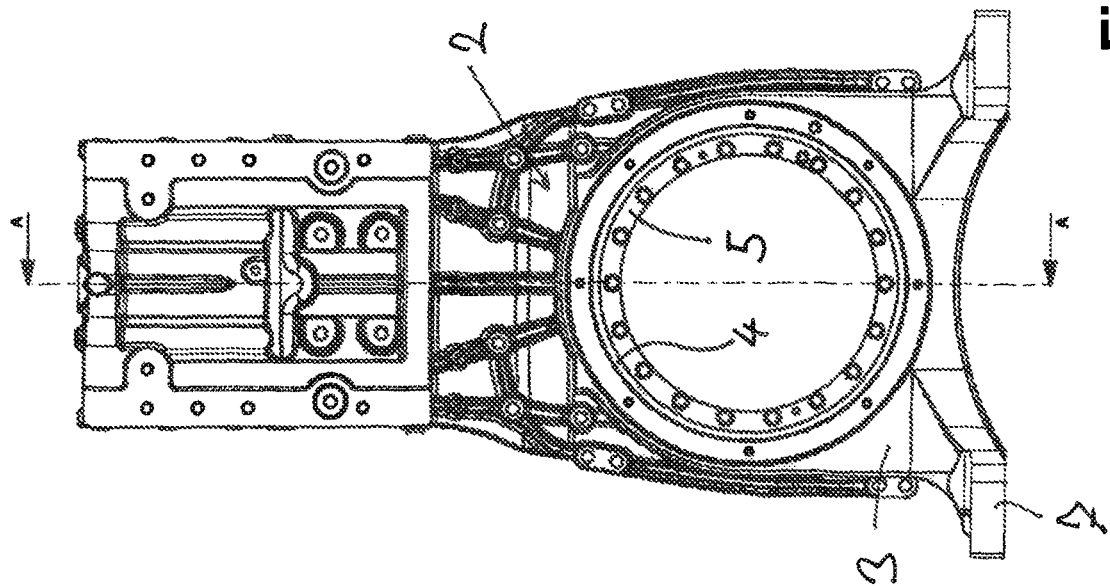
Figure 3:
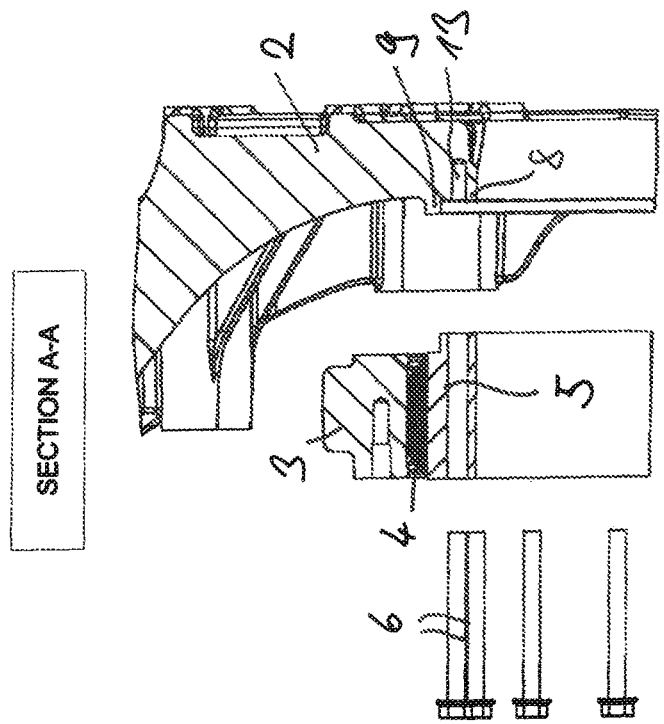
FIG. 3 two cut views along a plane extending in an axial and radial direction, showing two steps of an example method for assembling the trunnion mount, according to at least one example of the present disclosure.
Figure 3:
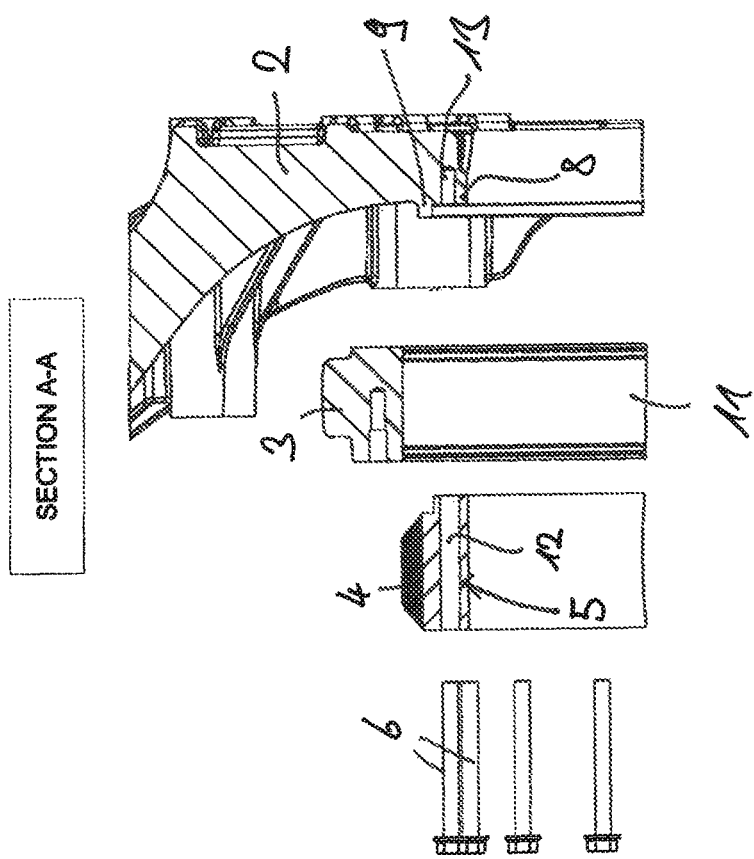

FIGS. 1 to 3 show an embodiment of a trunnion mount, in accordance to at least one example of the present disclosure. The trunnion mount shown in FIGS. 1 to 3 illustrates all the above-described aspects of the present disclosure provided in combination. The features described with respect to the various aspects can however also be applied on their own and without the features described with respect to other aspects.

It is further noted that FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The embodiment of a trunnion mount is used for connecting an engine 1 to a chassis via a support element having a ring portion 5, a rubber bearing 4 and a female support 3, with the female support 3 forming the link between the chassis and the engine 1.

According to an aspect of the present disclosure, the support element has a ring portion 5 with an outer bearing surface 10, onto which the rubber bearing 4 is directly vulcanized. The rubber bearing 4 may extend around the entire circumference of the ring portion 5.

In the embodiment, the side surfaces of the rubber bearing 4 are tapered.

In the embodiment, the rubber bearing consists of one or more rubber layers directly vulcanized on the bearing surface 10 and may not comprise any additional metal layers.

According to a further aspect of the present disclosure, the ring portion 5 is a separate element that can be connected to a mounting portion 2 of the support element via axial screws 6.

For this purpose, in the embodiment, holes 12 extend through the ring portion 5 in the axial direction from a first end surface of the ring portion to a second end surface of the ring portion 5 extending in the assembled state through the female support 3. The holes 12 are therefore still accessible when the ring portion is mounted to the female support 3.

The mounting portion 2 of the support element is provided with a ring-shaped mounting surface 8 abutting with the second end surface of the ring portion 5 and provided with screw holes 13 to which the screws 6 are connected. Further, the mounting portion 2 of the support element is provided with a ring-shaped protrusion 9 surrounding the ring-shaped mounting surface 8 and abutting with an outer side surface of the ring portion 5 next to the second end surface, thereby centering the ring portion 5 on the mounting portion 2.

The mounting portion 2, also referred to as a support, can be formed integrally with the engine casing and/or the engine block. Alternatively, the mounting portion 2 can be provided as a mounting plate connected to the engine casing and/or the engine block via screws. The ring portion 5 and/or the screws are therefore either directly connected to the engine casing and/or the engine block, or via at least one intermediate element.

According to a further aspect of the present disclosure, the ring portion 5 provided with the rubber bearing on its outer bearing surface is axially press-fit into the space defined by the inner bearing surface 11 of the female support 3 to compress the rubber bearing 4 in a radial direction between the outer bearing surface of the ring portion 5 and inner bearing surface 11 of the female support 3 when inserted, the outer bearing surface of the ring portion 5 and inner bearing surface 11 of the female support 3 extending coaxially in an axial and a circumferential direction with a radial distance therebetween. In at least one example, the bearing surface has a profile in the axial direction that will center the rubber bearing in the axial direction, in particular by providing a raised portion at both axial ends of the bearing surface 11.

The female support 3 has a ring portion extending around the entire circumference of the ring portion 5 that is formed as a single piece, for example as a cast iron part. The female support 3 further has mounting pads 7. In the embodiment, the mounting pads are formed integrally with the ring portion. In particular, the entire female support 3 may be formed as a single cast iron piece.

According to a further aspect of the present disclosure, the rubber bearing 4 and/or the ring portion 5 is connected to the female support 3 before the ring portion is connected to the engine. In particular, the rubber bearing 4 and/or the ring portion 5 can be connected to the female support 3 at the supplier plant and already delivered a unit to be mounted on the engine.

In particular, a press-fit between the rubber bearing 4 and the female support 3 can be done before the ring portion 5 is mounted on the engine and in particular at the supplier plant.

In a certain combination of the various aspects of the present disclosure, according to an embodiment of the disclsoure, the trunnion mount is provided by:

A support 2 rigidly mounted on the engine.

A bearing composed of an inner metal ring 5 and a rubber layer 4 directly vulcanized on inner ring.

A female support 3 in which the rubber/metal bearing is press fitted into at supplier plant. This female support and the rubber to metal ring 5 are linked to the support 2 through axial screws 6.

According to an embodiment of the disclosure, assembly of the trunnion mount is done in two main steps:

Step A: Press fitting of the rubber/metal ring 5 previously vulcanized together into the female support 3. This step is achieved at supplier plant.

Step B: Assembly of the module rubber/metal ring 5 to the support 2 thanks to axial fixation screws 6.

The support 2 can be connected to a casing of a gearing box

In the embodiment, the mounting portion 2 of the support element is formed as a cast iron part. In the embodiment, the mounting portion 2 is mounted on a casing of a transmission box connecting the crank shaft with the cam shaft and/or secondary power outputs. The transmission box is mounted on one axial side of the engine block. Alternatively, the mounting portion 2 can be formed integrally with the casing of the transmission box or the engine block.

In at least one example, the diameter of the outer bearing surface 10 of the ring portion 4 is larger than 20 cm, for example, larger than 30 cm. In the embodiment, a diameter of 41 cm is used.

Figure 4:
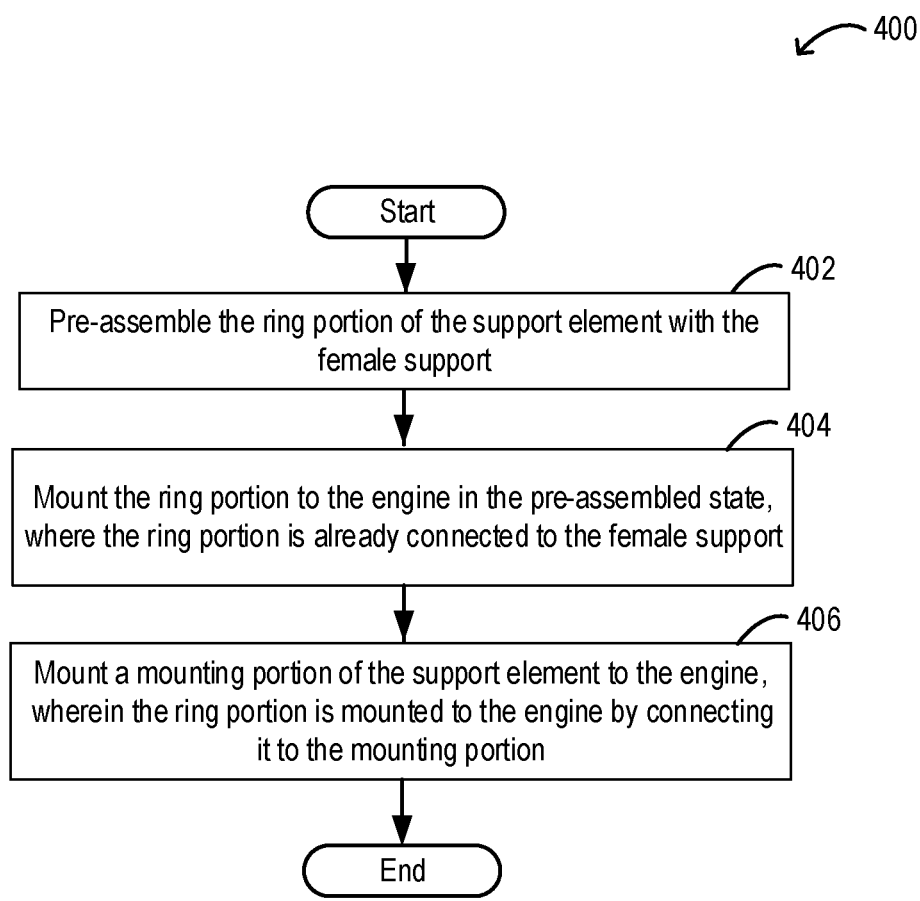
FIG. 4 a flow chart of an example method, according to at least one example of the present disclsoure.

Turning now to FIG. 4, FIG. 4 shows a flow chart of an example method 400 according to one or more examples of the present disclsoure. Method 400 may be a method for mounting an engine, in particular a combustion engine, to a chassis via a trunnion mount. In at least one example, the mount may be a trunnion mount including one or more of the features described above. In at least one example, the trunnion mount comprises a support element rigidly connected and/or connectable to the engine having a ring portion with an outer bearing surface, which may be arranged concentrically around the crankshaft; a female support having an inner bearing surface for surrounding the bearing surface of the support element, the female support forming the link between the chassis and the engine; and a rubber bearing arranged between the inner bearing surface of the female support and the outer bearing surface of the support element.

Method 400 comprises a step of pre-assembling the ring portion of the support element with the female support at step 402. Additionally, method 400 comprises a step of mounting the ring portion to the engine in the pre-assembled state, where the ring portion is already connected to the female support, at step 404.

In one or more examples, method 400 may further comprise a step of mounting a mounting portion of the support element to the engine, wherein the ring portion is mounted to the engine by connecting it to the mounting portion, at step 406. In one or more examples, the mounting portion of the support element may be formed integrally with an engine casing or an engine block. Further, in one or more examples of method 400, the ring portion of the support element and the female support are pre-assembled via a press-fit operation.

Major advantages of the present disclosure are as follows:

No small tolerances to be achieved at the bearing surface of the ring portion because the rubber is directly vulcanized on axial flanged ring. Thus, easy serialization may be achieved.

Optimized lateral packaging due to removal of vertical screws on the female support allows for the following:

Reduced proximity of surrounding components, which leads to a reduced risk of collision Increased rubber volume in same packaging, which leads to an increased bearing lifetime Assembly by rubber bearing and support by axial screws enables easy access to screws for maintenance operations.

Two particularly advantageous aspects of the present disclosure therefore are:

The trunnion mount being made of a rubber layer directly vulcanized on a support ring axially bolted to the engine, directly or through intermediate parts.

The axial press fitting of the rubber/metal ring into female part, allowing rubber compression in the radial direction without vertical screws and without half shelves.

In the embodiment, the engine is a linear engine. The same principle can however also be applied to other engine forms such as V-engines.

The invention claimed is:

1. An engine comprising a trunnion mount for mounting the engine to a chassis, comprising:
   a support element connected to the engine having a ring portion with an outer bearing surface, the outer bearing surface of the ring portion arranged concentrically around a crankshaft of the engine, the crankshaft extending through the ring portion,
   a female support having an inner bearing surface surrounding the outer bearing surface of the support element, the female support configured for forming a link between the chassis and the engine, and
   a rubber bearing arranged between the inner bearing surface of the female support and the outer bearing surface of the support element,
   wherein the outer bearing surface of the ring portion and the inner bearing surface of the female support extend in an axial direction and a circumferential direction of the crankshaft coaxially around the crankshaft and are arranged to face each other in a radial direction with a radial distance therebetween, and wherein the rubber bearing is radially positioned between the inner bearing surface of the female support and the outer bearing surface of the support element, and
   wherein a rubber surface of the rubber bearing is press-fit with the outer bearing surface of the ring portion and/or the inner bearing surface of the female support such that the rubber bearing is compressed in a radial direction between the outer bearing surface and the inner bearing surface.

2. The engine comprising the trunnion mount of claim 1, wherein the ring portion is connected to the support element via axial screws, and wherein the axial screws connect the ring portion to the support element without passing through the rubber bearing.

3. The engine comprising the trunnion mount of claim 1, wherein the support element comprises a mounting portion by which it is connected to the engine, wherein the ring portion is formed as a separate element from the mounting portion and connected thereto via axial screws, wherein the mounting portion of the support element has a mounting surface to which one axial end surface of the ring portion is abutting.

4. The engine comprising the trunnion mount of claim 3, wherein the mounting portion has a protrusion extending in an axial direction relative to the mounting surface, the protrusion abutting with an inner or outer side surface of the ring portion, wherein the protrusion is ring-shaped and/or concentric with the mounting surface.

5. The engine comprising the trunnion mount according to claim 1, wherein the female support has a ring section surrounding the ring portion of the support element around an entire circumference, wherein the ring section is formed as a single piece.

6. The engine comprising the trunnion mount according to claim 5, wherein the female support further comprises mounting pads for mounting the female support on the chassis.

7. The engine comprising the trunnion mount according to claim 6, wherein the ring section and the mounting pads are formed integrally as a single piece.

8. The engine comprising the trunnion mount according to claim 1, wherein the rubber bearing is one out of:
   a) directly vulcanized on the inner bearing surface and press-fit with the outer bearing surface; and
   b) directly vulcanized on the outer bearing surface and press-fit with the inner bearing surface.

9. The engine comprising the trunnion mount according to claim 1, wherein the ring portion is connectable to the engine in a pre-assembled state where it is already connected to the female support.

10. An apparatus comprising a chassis and an engine, wherein the engine is connected to the chassis by at least one trunnion mount according to claim 1, wherein the apparatus includes a mobile working machine.

11. The engine comprising the trunnion mount according to claim 1, wherein the rubber bearing is one out of:
   a) attached to the inner bearing surface of the female support, with the ring portion being axially press-fit into the space defined by an inner rubber surface of the rubber bearing to radially compress the rubber bearing between the inner bearing surface and the outer bearing surface when inserted in the space; and
   b) attached to the outer bearing surface of the ring portion, with the ring portion and the rubber bearing attached to its outer bearing surface being axially press-fit into the space defined by the inner bearing surface of the female support to compress the rubber bearing between the inner bearing surface and the outer bearing surface when inserted in the space.

12. A method for mounting an engine according to claim 1 to a chassis
   via the trunnion mount
   the method comprising:
      pre-assembling the ring portion of the support element with the female support via a press-fit operation; and
      mounting the ring portion to the engine in a pre-assembled state where the ring portion is already connected to the female support.

13. An engine comprising a trunnion mount for mounting the engine to a chassis, comprising:
   a crankshaft;
   a support element connected to the engine having a ring portion with an outer bearing surface, the outer bearing surface of the ring portion arranged concentrically around the crankshaft of the engine, the crankshaft extending through the ring portion,
   a female support having an inner bearing surface surrounding the outer bearing surface of the support element, the female support configured for forming a link between the chassis and the engine, and
   a rubber bearing arranged between the inner bearing surface of the female support and the outer bearing surface of the support element which extend in an axial direction and a circumferential direction of the crankshaft coaxially around the crankshaft and are arranged to face each other in a radial direction with a radial distance therebetween, and
   wherein the rubber bearing is radially positioned between the inner bearing surface of the female support and the outer bearing surface of the support element and at least one out of an outer surface and an inner surface of the rubber bearing extending in an axial direction and a circumferential direction of the crankshaft coaxially around the crankshaft is directly vulcanized on at least one of the inner bearing surface and the outer bearing surface.

14. The engine according to claim 13, wherein the support element further comprises a mounting portion by which it is connected to the engine, and
   the ring portion is formed one out of:
      a) integrally with the mounting portion of the support element; and
      b) as a separate element from the mounting portion and connected thereto via axial screws with the mounting portion of the support element having a mounting surface to which one axial end surface of the ring portion is abutting.

15. The engine according to claim 13, wherein the outer bearing surface of the ring portion and the inner bearing surface of the female support are circular in cross section and have a cylindrical form, wherein the rubber bearing is radially positioned between the inner bearing surface of the female support and the outer bearing surface of the support element.

16. The engine according to claim 13, wherein the rubber bearing is one out of:
   a) directly vulcanized on the inner bearing surface and press-fit with the outer bearing surface; and
   b) directly vulcanized on the outer bearing surface and press-fit with the inner bearing surface.

17. The engine according to claim 13, wherein the rubber bearing consists of one or more rubber layers directly vulcanized on at least one of the inner bearing surface and the outer bearing surface and does not comprise any additional metal layers.

18. The engine according to claim 13, wherein the rubber bearing has a cylindrical part extending around an entire circumference between the inner bearing surface and the outer bearing surface.

19. The engine according to claim 13, wherein the outer bearing surface of the ring portion and the inner bearing surface of the female support are circular in cross section and have a cylindrical form, wherein the rubber bearing is radially positioned between the inner bearing surface of the female support and the outer bearing surface of the support element.

20. The engine according to claim 13, wherein the rubber bearing is one out of:
   a) attached to the inner bearing surface of the female support, with the ring portion being axially press-fit into the space defined by an inner rubber surface of the rubber bearing to radially compress the rubber bearing between the inner bearing surface and the outer bearing surface when inserted in the space; and
   b) attached to the outer bearing surface of the ring portion, with the ring portion and the rubber bearing attached to its outer bearing surface being axially press-fit into the space defined by the inner bearing surface of the female support to compress the rubber bearing between the inner bearing surface and the outer bearing surface when inserted in the space.

21. The engine according to claim 13, wherein the rubber bearing is radially compressed between the inner bearing surface and the outer bearing surface.

\* \* \* \* \*